(12) United States Patent
Yamamoto

(10) Patent No.: US 10,992,760 B2
(45) Date of Patent: Apr. 27, 2021

(54) INFORMATION PROCESSING SYSTEM, SESSION MANAGEMENT METHOD, AND NON-TRANSITORY COMPUTER-READABLE STORAGE MEDIUM

(71) Applicant: FUJITSU LIMITED, Kawasaki (JP)

(72) Inventor: Tsubasa Yamamoto, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 201 days.

(21) Appl. No.: 15/849,918

(22) Filed: Dec. 21, 2017

(65) Prior Publication Data

US 2018/0191840 A1     Jul. 5, 2018

(30) Foreign Application Priority Data

Jan. 4, 2017   (JP) .............................. JP2017-000181

(51) Int. Cl.
*H04L 29/08*     (2006.01)
*G06F 9/455*     (2018.01)

(52) U.S. Cl.
CPC ........ *H04L 67/148* (2013.01); *G06F 9/45558* (2013.01); *H04L 67/146* (2013.01); *G06F 2009/45575* (2013.01)

(58) Field of Classification Search
None
See application file for complete search history.

(56) References Cited

U.S. PATENT DOCUMENTS

| 6,539,494 B1* | 3/2003 | Abramson | G06F 11/203 714/4.3 |
| 8,583,601 B1* | 11/2013 | Claudatos | G06F 11/1461 707/654 |
| 2012/0016977 A1* | 1/2012 | Robertson | H04L 63/20 709/224 |
| 2016/0373520 A1* | 12/2016 | Kumar | H04L 67/1002 |

FOREIGN PATENT DOCUMENTS

JP     2012-103879     5/2012

* cited by examiner

*Primary Examiner* — Nasser M Goodarzi
*Assistant Examiner* — Terrika Peterson
(74) *Attorney, Agent, or Firm* — Fujitsu Patent Center

(57) ABSTRACT

An information processing apparatus including: a processor configured to: receive halted virtual machine information that identifies a first virtual machine to be halted in a plurality of virtual machines that execute requests each being distributed to one of the plurality of virtual machines, receive, from a second virtual machine, specified session identification that identifies a specified session associated with a second request to be executed by the second virtual machine when the second virtual machine does not hold, specified session information taken over from a first request to the second request, the first request being associated with the specified session and having been executed specified one of the plurality of virtual machines other than the second virtual machine, request, when detecting the specified one of the plurality of the virtual machines is the first virtual machine, transmission of the specified session information held in the first virtual machine.

8 Claims, 18 Drawing Sheets

FIG. 3

| SESSION ID | SORTING DESTINATION VIRTUAL MACHINE |
|---|---|
| sessionA | VIRTUAL MACHINE A |
| sessionB | VIRTUAL MACHINE C |
| ... | ... |

FIG. 5

| SESSION ID | SESSION INFORMATION |
|---|---|
| sessionA | XXXX |
| ... | ... |

| SESSION ID | SESSION INFORMATION | VIRTUAL MACHINE | BACKUP STATUS |
|---|---|---|---|
| sessionA | XXXX | VIRTUAL MACHINE A | COMPLETED |
| sessionB | YYYY | VIRTUAL MACHINE C | |
| sessionC | ZZZZ | VIRTUAL MACHINE A | |
| ... | ... | ... | ... |

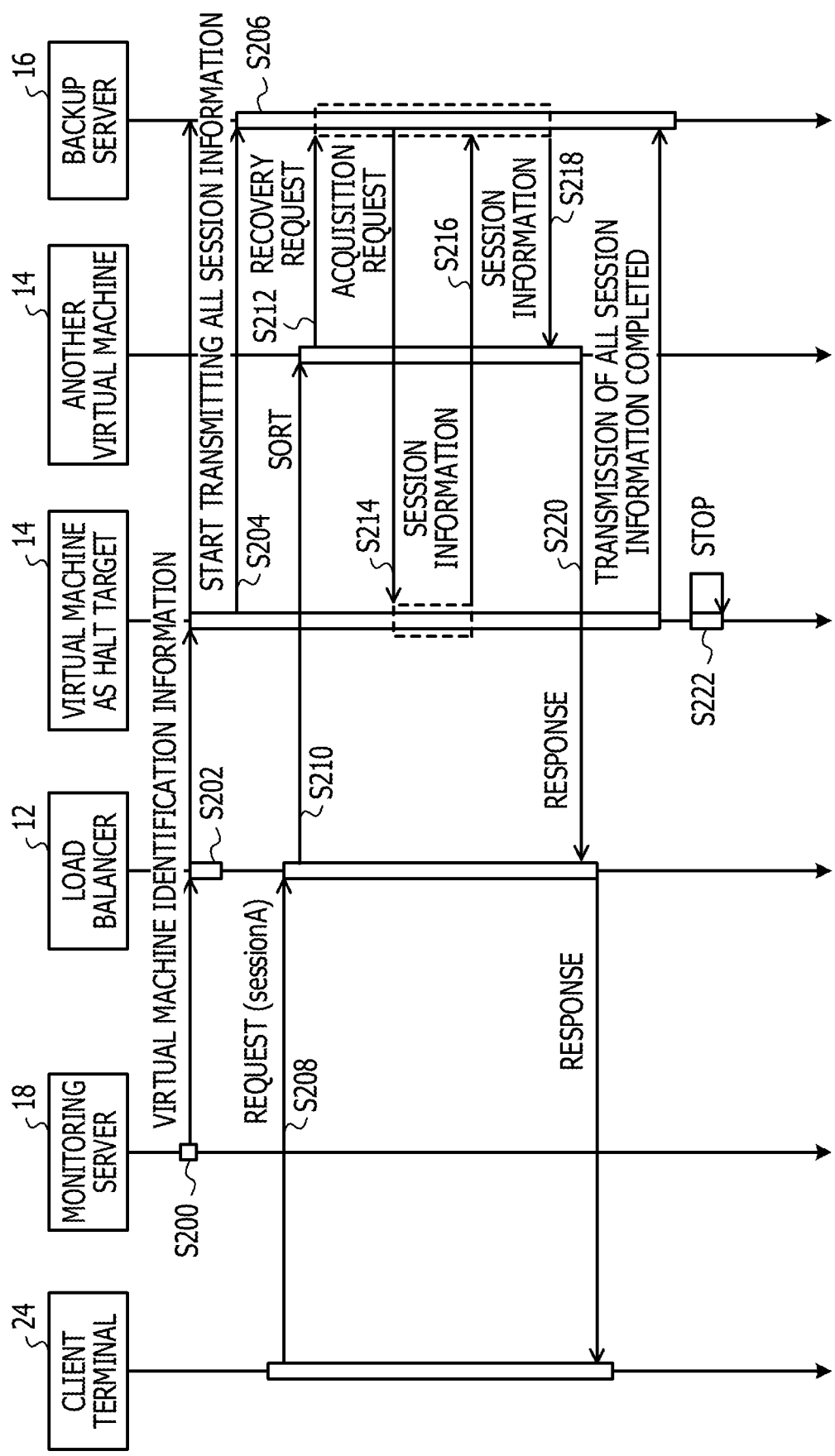

INFORMATION PROCESSING SYSTEM, SESSION MANAGEMENT METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-000181, filed on Jan. 4, 2017, the entire contents of which are incorporated herein by reference.

FIELD

The embodiment discussed herein is related to an information processing apparatus, a session management method, and a non-transitory computer-readable storage medium.

BACKGROUND

Session management methods of systems including multiple server apparatuses have been disclosed. For example, if an arrival time when session information is transferred from a first server apparatus to a second server apparatus is later than a time point when the first server apparatus receives a request from a client and a time point when the first server apparatus has returned a response to the client, the following technique disclosed herein is performed. In the disclosed technique, the first server apparatus assigns a newly received request to the second server apparatus in accordance with transfer destination information indicating a transfer destination of the session information.

Reference is made to Japanese Laid-open Patent Publication No. 2012-103879 for related art technique.

SUMMARY

According to an aspect of the invention, an information processing apparatus includes a memory, and a processor coupled to the memory and the processor configured to: receive halted virtual machine information that identifies a first virtual machine to be halted in a plurality of virtual machines that execute requests, each of the requests being distributed to one of the plurality of virtual machines, receive, from a second virtual machine in the plurality of virtual machines, specified session identification that identifies a specified session associated with a second request to be executed by the second virtual machine when the second virtual machine does not hold, specified session information taken over from a first request to the second request, the first request being associated with the specified session and having been executed specified one of the plurality of virtual machines other than the second virtual machine, request, when detecting the specified one of the plurality of the virtual machines is the first virtual machine, transmission of the specified session information held in the first virtual machine, receive the specified session information from the first virtual machine, and transmit the specified session information to the second virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a sorting management table;

FIG. 5 illustrates an example of a session management table;

FIG. 7 illustrates an example of a backup management table;

FIG. 18 is a sequence chart illustrating an example of a series of processes until a virtual machine of the embodiment halts.

DESCRIPTION OF EMBODIMENT

Figure 1:
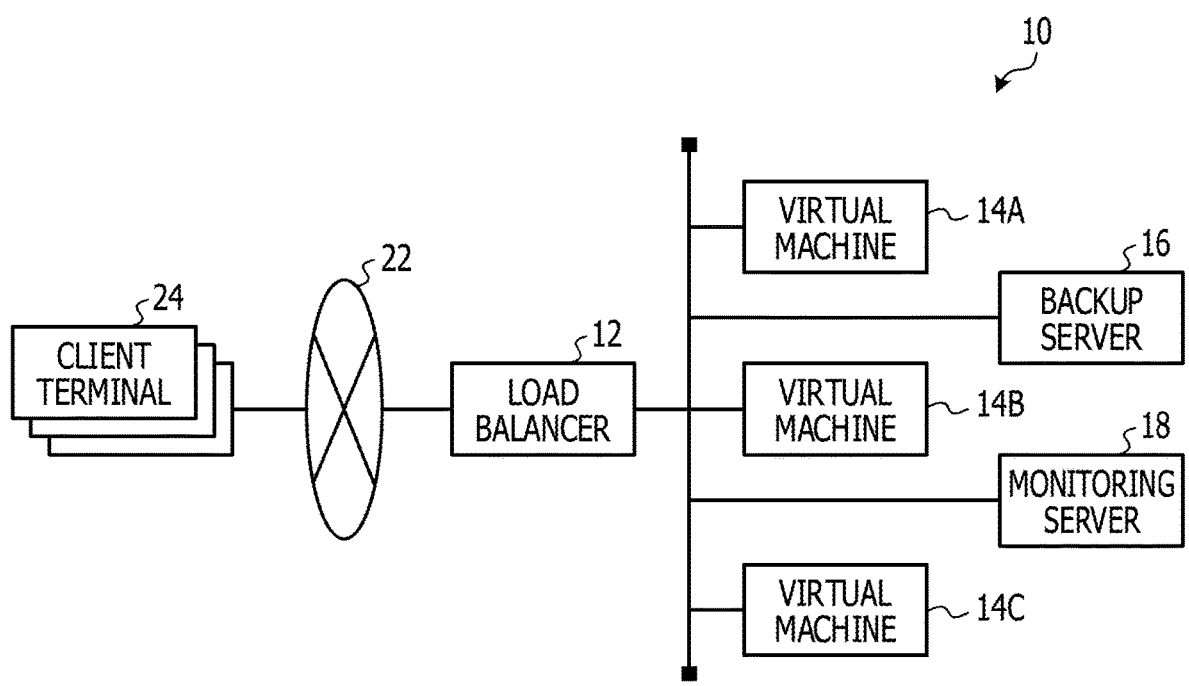
FIG. 1 is a block diagram schematically illustrating an information processing system of an embodiment.

When a stateless protocol, such as hypertext transfer protocol (HTTP), is used, a stateful process may be performed by taking over session information between different requests.

When a service, such as a web service, is provided using an information processing system in which multiple virtual machines are operative, some virtual machines may be halted depending on resource status of the virtual machines and the number of executed requests. In such a case, if another virtual machine does not use the latest session information of the virtual machine to be halted, a process that has been performed with the virtual machine as the halt target is difficult to perform on the other virtual machine.

In one aspect of the embodiment, a process based on the latest session information is desirably performed if some of multiple virtual machines are halted.

Referring to the drawings, the embodiment is described in detail below. In the discussion of the embodiment, the technique disclosed herein is applied to an information processing system that provides a service through HTTP as an example of a stateless protocol, and performs a stateful process.

Referring to FIG. 1, a configuration of an information processing system 10 of the embodiment is described below. As illustrated in FIG. 1, the information processing system 10 includes a load balancer 12, multiple virtual machines 14A through 14C (three virtual machines in FIG. 1), a backup server 16 as an example of the information processing apparatus, and a monitoring server 18. In the discussion that follows, when the virtual machines 14A through 14C are collectively referred without difference, the trailing alphabets are omitted. The number of virtual machines 14 is not limited to three, and may be two, or four or more.

The load balancer 12 is connected to a network 20, such as a local-area network (LAN), and a network 22, such as a wide-area network (WAN). The virtual machines 14, the backup server 16, and the monitoring server 18 are connected to the network 20.

The load balancer 12 receives an HTTP request (hereinafter simply referred to as a "request") from each of multiple client terminals 24 connected to the network 22, and distributes the received requests to the virtual machines 14 for load balancing.

The virtual machine 14 operates a web application server, and performs a process responsive to a request by distributed by the load balancer 12. The virtual machine 14 returns execution results of the process responsive to the request as an HTTP response (hereinafter simply referred to as a "response") to the client terminal 24 serving as a transmission source of the request via the load balancer 12.

The backup server 16 performs a process related to a backup and recovery operation of session information stored on a specific storage region on the virtual machine 14. The monitoring server 18 monitors the resource status of the virtual machine 14.

Figure 2:
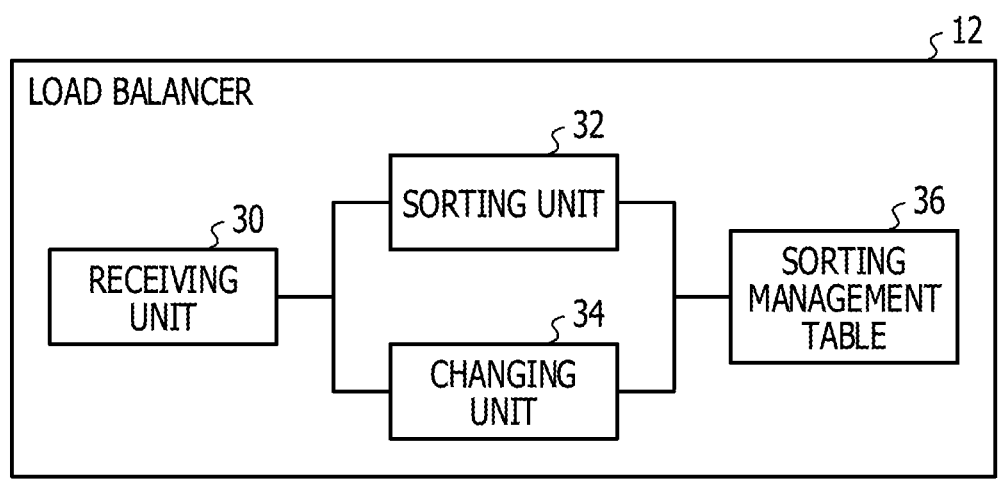
FIG. 2 is a functional block diagram of a load balancer of the embodiment.

Referring to FIG. 2, the functional configuration of the load balancer 12 of the embodiment is described below. As illustrated in FIG. 2, the load balancer 12 includes a receiving unit 30, a sorting unit 32, and a changing unit 34. A sorting management table 36 is stored on a specific storage region of the load balancer 12.

The sorting management table 36 stores information related to the virtual machine 14 that serves as a sorting destination of the request. FIG. 3 illustrates an example of the sorting management table 36. Referring to FIG. 3, the sorting management table 36 lists, in association with each other, session identification (ID) identifying an HTTP session (hereinafter simply referred to as a "session") of the request and a sorting destination virtual machine indicating the virtual machine 14 that serves as a sorting destination of the request. An example of the "sorting destination virtual machine" may be information, such as an Internet protocol (IP) address, and a host name identifying the virtual machine 14.

The receiving unit 30 receives a request transmitted from the client terminal 24. The receiving unit 30 also receives virtual machine identification information transmitted from the monitoring server 18 and identifying the virtual machine 14 that is a halt target (hereinafter referred to as a "halt target virtual machine 14").

When a request is received via the receiving unit 30, the sorting unit 32 acquires a session ID that is set to be cookie information of an HTTP header of the request. The sorting unit 32 references the sorting management table 36, and sorts the request received by the receiving unit 30 to the virtual machine 14 responsive to the acquired session ID. When the virtual machine 14 operates normally, the load balancer 12 of the embodiment sorts a request for a series of processes having the same session ID to the same virtual machine 14.

If the session ID is not contained in the request received by the receiving unit 30, the sorting unit 32 sorts the request to one of the virtual machines 14. The virtual machine 14 performs a process responsive to the request sorted thereto, and inserts the session ID in the HTTP header of the response when the virtual machine 14 returns the execution results the client terminal 24. The load balancer 12 references the HTTP header of the response transmitted from the virtual machine 14, and adds in the sorting management table 36 the session ID and information identifying the virtual machine 14 as the sorting destination.

When the receiving unit 30 receives the virtual machine identification information, the sorting unit 32 stops sorting the requests to the halt target virtual machine 14. For example, by suspending a health check to the halt target virtual machine 14, the sorting unit 32 stops sorting the request to the halt target virtual machine 14. In this case, even if a sorting destination virtual machine responsive to the acquired session ID in the sorting management table 36 is the halt target virtual machine 14, the sorting unit 32 sorts the request to a virtual machine 14 other than the halt target virtual machine 14.

When the receiving unit 30 receives the virtual machine identification information, the changing unit 34 changes the sorting destination of the request to the virtual machine 14 other than the halt target virtual machine 14 identified by the virtual machine identification information. In accordance with the embodiment, the changing unit 34 changes the halt target virtual machine 14 to a virtual machine 14 other than the halt target virtual machine 14 in a sorting destination virtual machine column storing information indicating the halt target virtual machine 14 in the sorting management table 36.

The virtual machine 14 to which the sorting management table 36 changes in a sorting destination virtual machine column in the sorting management table 36 is not particularly limited to any virtual machine 14. For example, the changing unit 34 randomly selects a virtual machine 14 other than the halt target virtual machine 14, and changes the sorting destination virtual machine column to the selected virtual machine 14. Alternatively, the changing unit 34 may change the sorting destination virtual machine column to the virtual machine 14 other than the halt target virtual machine 14 so that virtual machines 14 of the sorting destination virtual machine column are equal in number.

Figure 4:
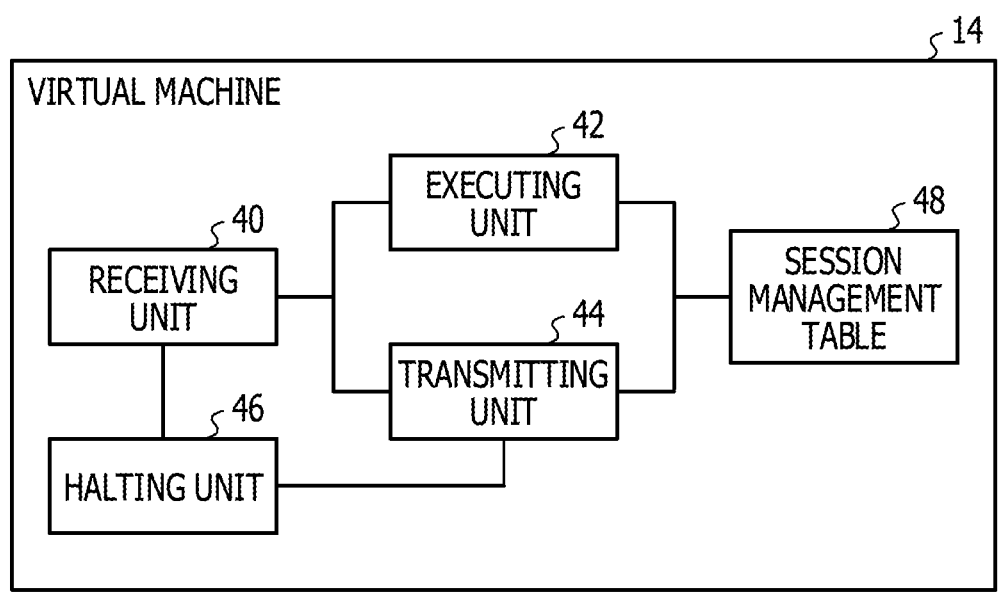
FIG. 4 is a functional block diagram of a virtual machine of the embodiment.

Referring to FIG. 4, the functionality of the virtual machine 14 of the embodiment is described. As illustrated in FIG. 4, the virtual machine 14 includes a receiving unit 40, an executing unit 42, a transmitting unit 44, and a halting unit 46. A session management table 48 is stored on a specific storage region of the virtual machine 14.

The session management table 48 stores session information on a per session basis. FIG. 5 illustrates an example of the session management table 48. Referring to FIG. 5, the session management table 48 stores a session ID and session information associated therewith. The session information herein refers to information that is transferred between different requests to execute a series of processes. For example, in a shopping site, the session information indicates information indicating a commercial product added to a cart and a quantity of commercial products.

The receiving unit 40 receives a request that is sorted by the load balancer 12. The receiving unit 40 also receives the virtual machine identification information transmitted from the monitoring server 18 and identifying the halt target virtual machine 14. The receiving unit 40 further receives an acquisition request for the session information identified by the session ID and transmitted by the backup server 16 (hereinafter referred to as "session acquisition request"). The receiving unit 40 also receives the session information transmitted from the backup server 16.

The executing unit 42 performs a process responsive to the request received by the receiving unit 40. If the session ID is contained in the request, the executing unit 42 references the session management table 48 and performs the process responsive to the request, using the session information responsive to the session ID contained in the request. If the session information is updated along with the execution of the process responsive to the request, the executing unit 42 updates the session information responsive to the session ID contained in the request in the session management table 48. The executing unit 42 returns the execution results of the process responsive to the request via the load balancer 12 to the client terminal 24 that is the transmission source of the request.

If a record responsive to the session ID contained in the request is not stored in the session management table 48, the executing unit 42 instructs the transmitting unit 44 to transmit a recovery request of the session information to the transmitting unit 44. In this case, the executing unit 42 performs a process responsive to the request, using the session information that the backup server 16 has transmitted in response to the recovery request and has been received by the receiving unit 40. The executing unit 42 then updates the session management table 48.

When the receiving unit 40 receives the virtual machine identification information identifying the halt target virtual machine 14, the transmitting unit 44 transmits all records in the session management table 48 to the backup server 16. The transmitting unit 44 also transmits to the backup server 16 all records in the session management table 48 periodically, for example, once every 10 minutes. When the receiving unit 40 receives a session acquisition request, the transmitting unit 44 references the session management table 48 and transmits to the backup server 16 the session information responsive to the session ID contained in session acquisition request.

If the record responsive to the session ID contained in the request is not stored in the session management table 48 when the executing unit 42 performs the process responsive to the request, the transmitting unit 44 transmits to the backup server 16 the recovery request for the session information. In such a case, the transmitting unit 44 includes the session ID contained in the request in the recovery request and then transmits the recovery request to the backup server 16.

If the receiving unit 40 has received the virtual machine identification information identifying the halt target virtual machine 14, the halting unit 46 halts the host virtual machine 14 after the transmitting unit 44 transmits all records in the session management table 48.

Figure 6:
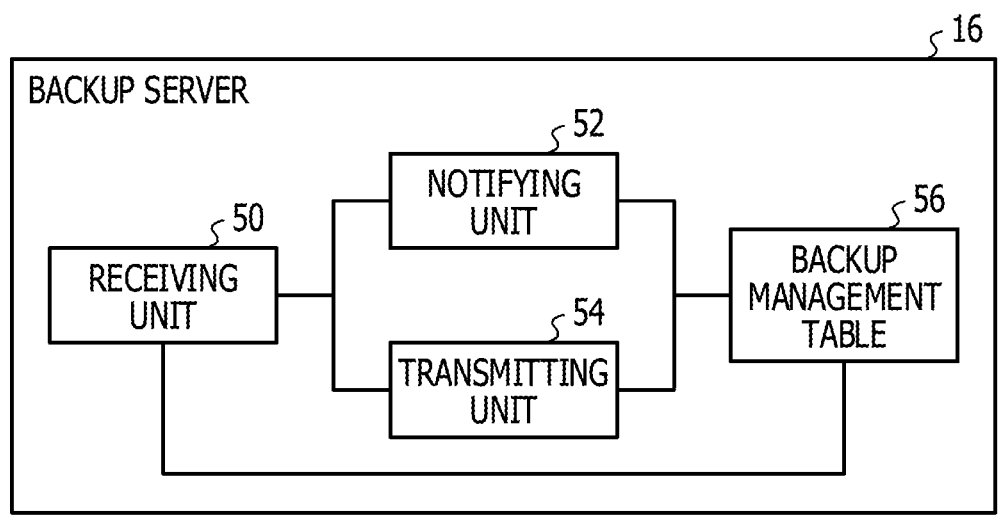
FIG. 6 is a functional block diagram of a backup server.

Referring to FIG. 6, the functional configuration of the backup server 16 of the embodiment is described below. Referring to FIG. 6, the backup server 16 includes a receiving unit 50, a notifying unit 52, and a transmitting unit 54. The backup server 16 stores a backup management table 56 on a specific storage region thereof.

The backup management table 56 is used as a backup to recover the session information. FIG. 7 illustrates an example of the backup management table 56. Referring to FIG. 7, the backup management table 56 stores the session ID, the session information, information identifying the virtual machine 14 holding the session information, and a backup status in a manner that mutually associates one piece of information with another.

The receiving unit 50 receives the virtual machine identification information transmitted from the monitoring server 18 and identifying the halt target virtual machine 14. The receiving unit 50 also receives a recovery request for the session information transmitted from the virtual machine 14. The receiving unit 50 further receives records (namely, the session ID and the session information) in the session management table 48 transmitted from the virtual machine 14. The receiving unit 50 stores on the backup management table 56 the received session ID, the session information, and information identifying the virtual machine 14 serving as a transmission source of the session information. Along with the storage operation, the receiving unit 50 updates a backup status column in the backup management table 56.

The notifying unit 52 notifies the halt target virtual machine 14 identified by the virtual machine identification information received by the receiving unit 50 of an acquisition request for the session information identified by the session ID contained in the recovery request received by the receiving unit 50. In accordance with the embodiment, when the receiving unit 50 receives the recovery request, the notifying unit 52 references the backup management table 56 and notifies the virtual machine 14 corresponding to the session ID contained in the recovery request of the acquisition request for the session information.

The receiving unit 50 may receive the recovery request transmitted from the virtual machine 14 other than the halt target virtual machine 14 after starting receiving all records in the session management table 48 transmitted from the halt target virtual machine 14. In such a case, the notifying unit 52 performs the following process. If the receiving unit 50 has not yet received the session information responsive to the session ID contained in the recovery request, the notifying unit 52 notifies the halt target virtual machine 14 of the acquisition request for the session information.

When the receiving unit 50 receives the session information in reply to the notification of the acquisition request from the notifying unit 52, the transmitting unit 54 transmits the received session information to the virtual machine 14 that is the transmission source of the recovery request.

Figure 8:
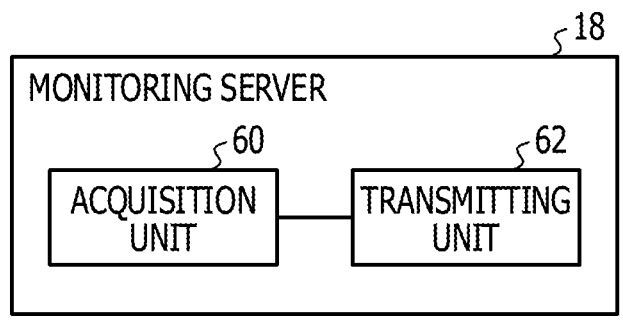
FIG. 8 is a functional block diagram illustrating a monitoring server of the embodiment.

Referring to FIG. 8, the functional configuration of the monitoring server 18 of the embodiment is described below. Referring to FIG. 8, the monitoring server 18 includes an acquisition unit 60 and a transmitting unit 62.

The acquisition unit 60 acquires periodically, for example, once every minute, from each virtual machine 14 the number of requests each virtual machine 14 has executed, and calculates the number of requests executed per unit time. The transmitting unit 62 sets each virtual machine 14 having the number of executed requests calculated by the acquisition unit 60 less than a threshold value to be a halt target virtual machine 14. The transmitting unit 62 transmits the virtual machine identification information identifying the halt target virtual machine 14 to the load balancer 12, the halt target virtual machine 14, and the backup server 16. For example, if there are multiple halt target virtual machines 14 having the number of executed requests calculated by the acquisition unit 60 less than the threshold value, the transmitting unit 62 indicates that the virtual machine 14 having the smallest number of executed requests is set to be a halt target virtual machine 14.

The acquisition unit 60 may acquire a CPU utilization rate and a memory utilization rate of each virtual machine 14 per unit time. The transmitting unit 62 sets a virtual machine 14 having the CPU utilization rate and the memory utilization rate acquired by the acquisition unit 60 less than the threshold values thereof to be a halt target virtual machine 14. Concerning the threshold values, the CPU utilization rate and the memory utilization rate may be the same or different.

Figure 9:
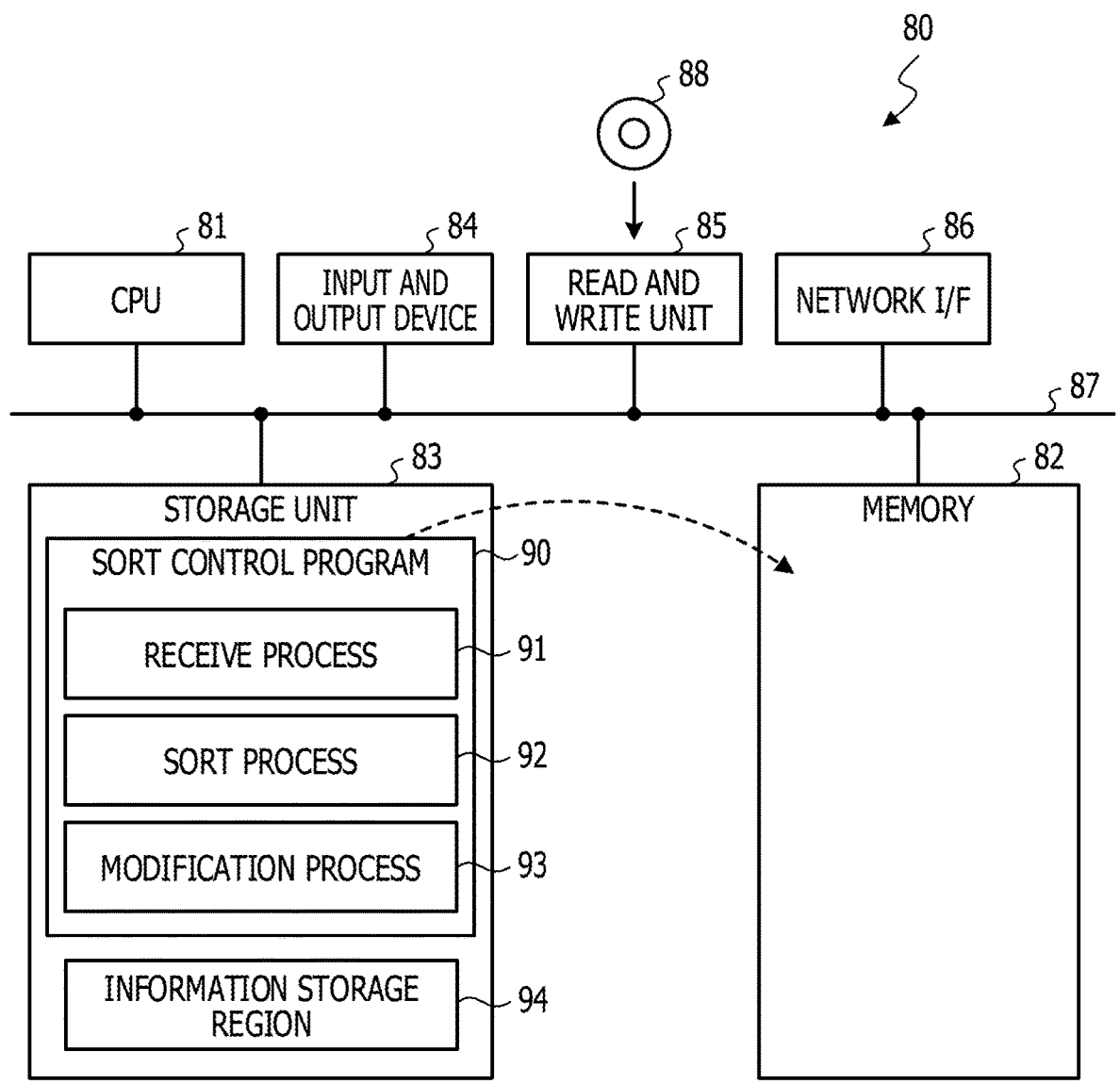
FIG. 9 is a block diagram schematically illustrating a computer that operates as the load balancer of the embodiment.

The load balancer 12 may be implemented using a computer 80 of FIG. 9. The computer 80 includes a central processing unit (CPU) 81, a memory 82 serving as a temporary memory, and a non-volatile storage unit 83. The computer 80 also includes an input and output device 84 that includes a display device and an input device. Further, the computer 80 includes a read and write unit 85 that controls writing and reading of data onto a recording medium 88, and a network interface 86 that is connected to a network. The CPU 81, the memory 82, the storage unit 83, the input and output device 84, the read and write unit 85, and the network interface 86 are interconnected to each other via a bus 87.

The storage unit 83 is implemented by a hard disk drive (HDD), a solid-state drive (SSD), or a flash memory. The storage unit 83 serving as a memory medium stores a sort control program 90 that causes the computer 80 to operate as the load balancer 12. The sort control program 90 includes a receive process 91, a sort process 92, and a modification process 93. The storage unit 83 includes an information storage region 94 that stores the sorting management table 36.

The CPU 81 reads the sort control program 90 from the storage unit 83 and expands the sort control program 90 onto the memory 82, and performs each process included in the sort control program 90. By performing the receive process 91, the CPU 81 operates as the receiving unit 30 of FIG. 2. By performing the sort process 92, the CPU 81 operates as the sorting unit 32 of FIG. 2. By performing the modification process 93, the CPU 81 operates as the changing unit 34 of FIG. 2. In this way, the computer 80 executing the sort control program 90 operates as the load balancer 12. Note that the CPU 81 performing the process of the sort control program 90 is a hardware component.

The functionality implemented by the sort control program 90 may be implemented by a semiconductor integrated circuit, such as an application specific integrated circuit (ASIC).

Figure 10:
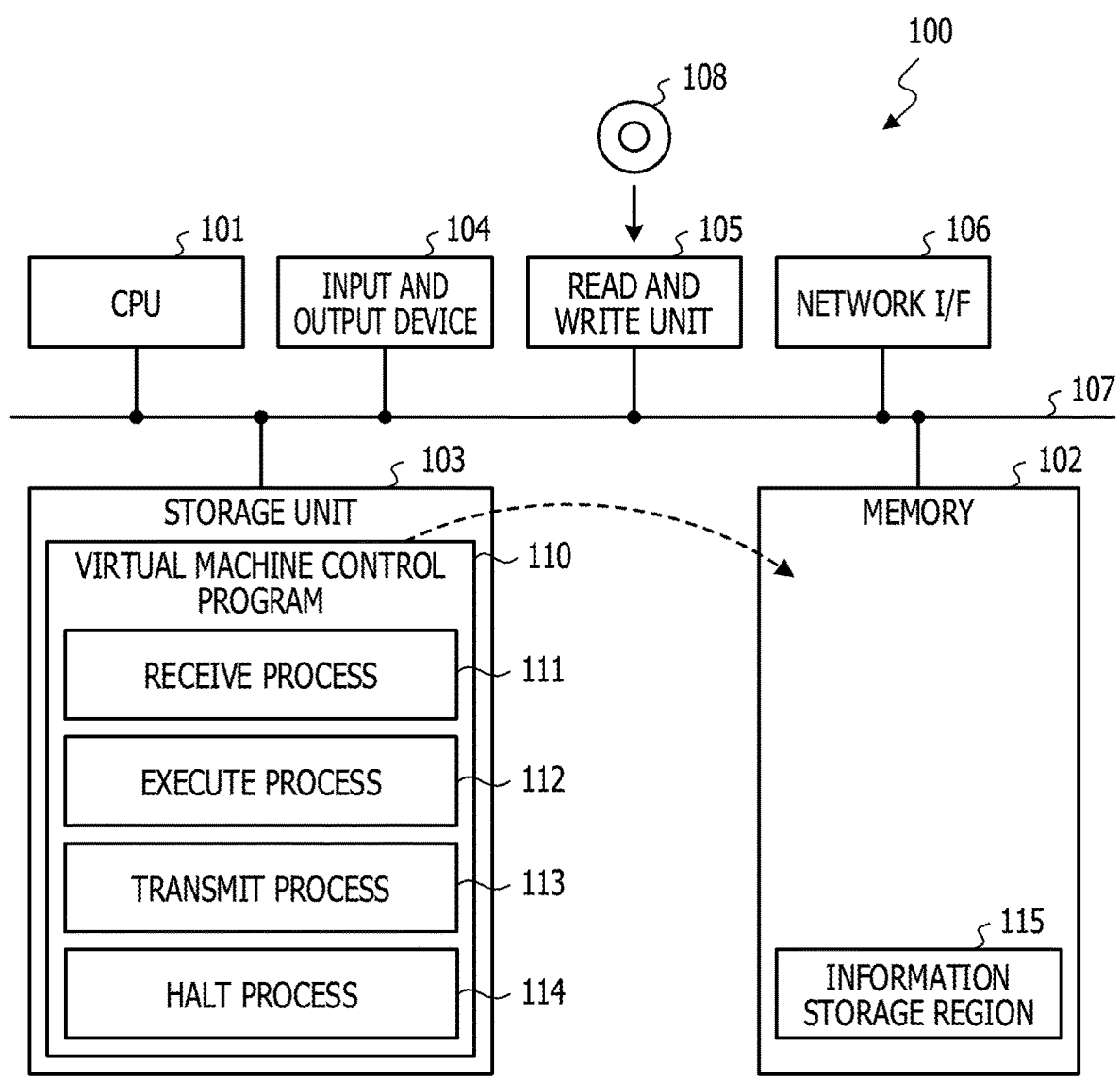
FIG. 10 is a block diagram schematically illustrating a computer that operates as the virtual machine.

The virtual machine 14 may be implemented by a computer 100 illustrated in FIG. 10, for example. The computer 100 includes a CPU 101, a memory 102 serving as a temporary memory region, and a non-volatile storage unit 103. The computer 100 also includes an input and output device 104 that includes a display device and an input device. Further, the computer 100 includes a read and write unit 105 that controls writing and reading of data onto a recording medium 108, and a network interface 106 that is connected to a network. The CPU 101, the memory 102, the storage unit 103, the input and output device 104, the read and write unit 105, and the network interface 106 are interconnected to each other via a bus 107. Part of each the CPU 101, the memory 102, and the storage unit 103 is assigned to the virtual machine 14 as virtual hardware.

The storage unit 103 is implemented by an HDD, an SSD, or a flash memory. The storage unit 103 serving as a memory medium stores a virtual machine control program 110 that causes the computer 100 to operate as the virtual machine 14. The virtual machine control program 110 includes a receive process 111, an execute process 112, a transmit process 113, and a halt process 114. The memory 102 includes an information storage region 115 where the session management table 48 is stored.

The CPU 101 reads the virtual machine control program 110 from the storage unit 103 and expands the virtual machine control program 110 onto the memory 102, thereby performing each process included in the virtual machine control program 110. By performing the receive process 111, the CPU 101 operates as the receiving unit 40 of FIG. 4. By performing the execute process 112, the CPU 101 operates as the executing unit 42 of FIG. 4. By performing the transmit process 113, the CPU 101 operates as the transmitting unit 44 of FIG. 4. By performing the halt process 114, the CPU 101 operates as the halting unit 46 of FIG. 4. The computer 100 having executed the virtual machine control program 110 operates as the virtual machine 14. Note that the CPU 101 performing each process of the virtual machine control program 110 is a hardware component.

Figure 11:
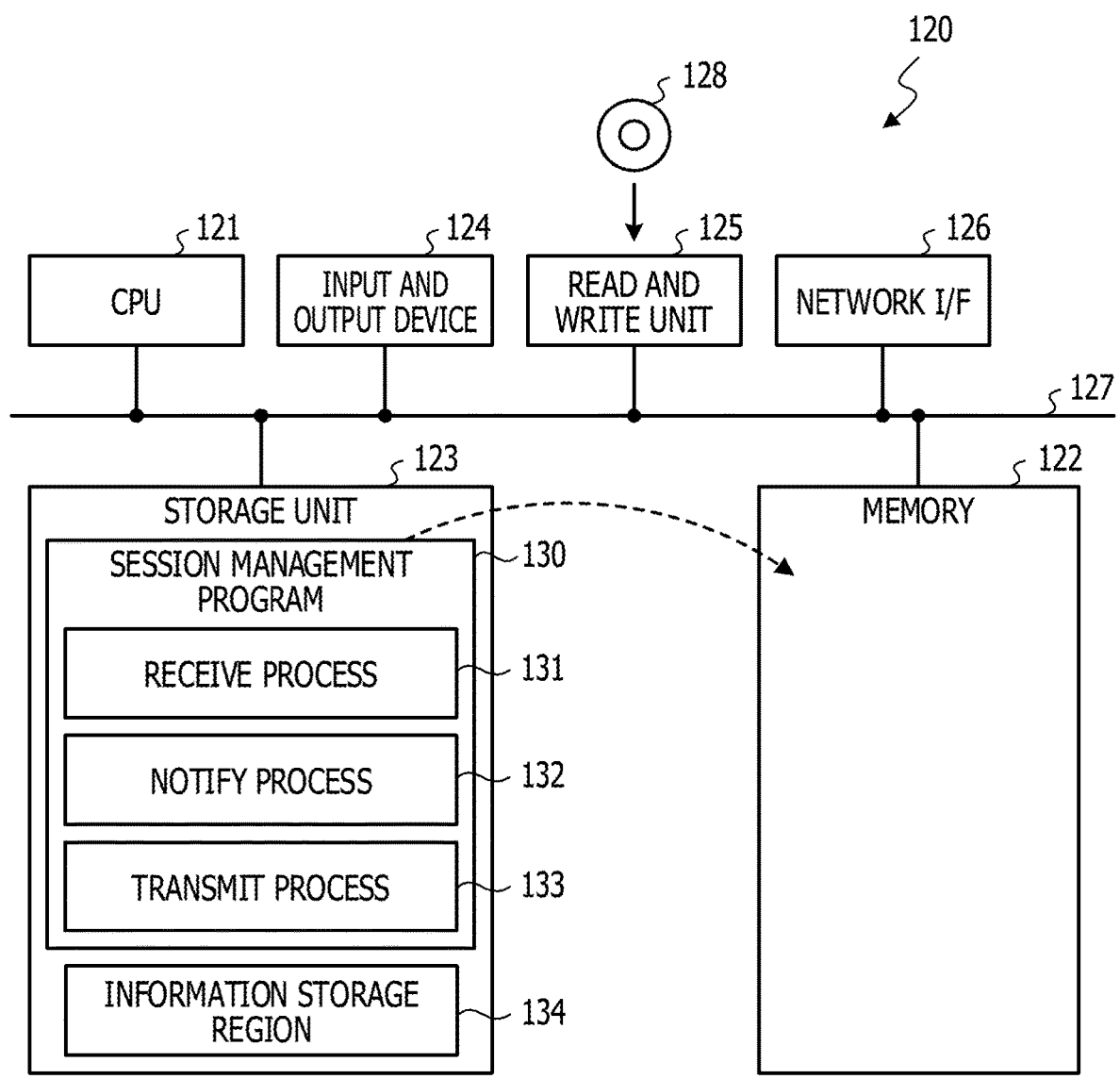
FIG. 11 is a block diagram schematically illustrating a computer that operates the backup server of the embodiment.

The backup server 16 may be implemented by a computer 120 illustrated in FIG. 11, for example. The computer 120 includes a CPU 121, a memory 122 serving as a temporary memory region, and a non-volatile storage unit 123. The computer 120 also includes an input and output device 124 that includes a display device and an input device. Further, the computer 120 includes a read and write unit 125 that controls writing and reading of data onto a recording medium 128, and a network interface 126 that is connected to a network. The CPU 121, the memory 122, the storage unit 123, the input and output device 124, the read and write unit 125, and the network interface 126 are interconnected to each other via a bus 127.

The storage unit 123 is implemented by an HDD, an SSD, or a flash memory. The storage unit 123 serving as a memory medium stores a session management program 130 to cause the computer 120 to operate as the backup server 16. The session management program 130 includes a receive process 131, a notify process 132, and a transmit process 133. The storage unit 123 includes an information storage region 134 where the backup management table 56 is stored.

The CPU 121 reads the session management program 130 from the storage unit 123 and expands the session management program 130 onto the memory 122, thereby performing each process in the session management program 130. By performing the receive process 131, the CPU 121 operates as the receiving unit 50 of FIG. 6. By performing the notify process 132, the CPU 121 operates as the notifying unit 52 of FIG. 6. By performing the transmit process 133, the CPU 121 operates as the transmitting unit 54 of FIG. 6. In this way, the computer 120 having executed the session management program 130 operates as the backup server 16. Note that the CPU 121 performing each process in the session management program 130 is a hardware component.

The functionality implemented by the session management program 130 may be implemented by a semiconductor integrated circuit, such as ASIC.

Figure 12:
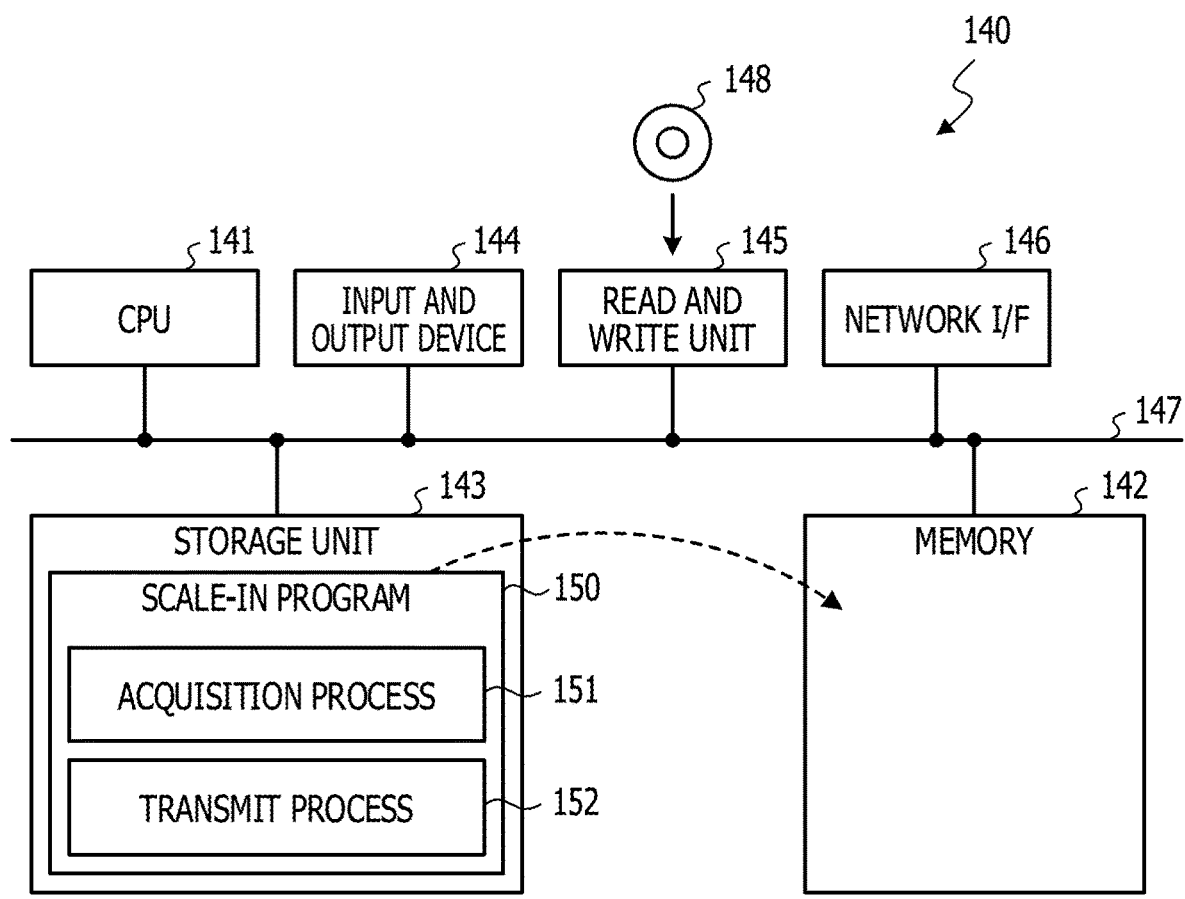
FIG. 12 is a block diagram schematically illustrating a computer that operates the monitoring server of the embodiment.

The monitoring server 18 may be implemented by a computer 140 illustrated in FIG. 12, for example. The computer 140 includes a CPU 141, a memory 142 serving as a temporary memory region, and a non-volatile storage unit 143. The computer 140 also includes an input and output device 144 that includes a display device and an input device. Further, the computer 140 includes a read and write unit 145 that controls writing and reading of data onto a recording medium 148, and a network interface 146 that is connected to a network. The CPU 141, the memory 142, the storage unit 143, the input and output device 144, the read and write unit 145, and the network interface 146 are interconnected to each other via a bus 147.

The storage unit 143 is implemented by an HDD, an SSD, or a flash memory. The storage unit 143 serving as a memory medium stores a scale-in program 150 that causes the computer 140 to operate as the monitoring server 18. The scale-in program 150 includes an acquisition process 151 and a transmit process 152.

The CPU 141 reads the scale-in program 150 from the storage unit 143, and expands the scale-in program 150 onto the memory 142, thereby performing each process in the scale-in program 150. By performing the acquisition process 151, the CPU 141 operates as the acquisition unit 60 of FIG. 8. By performing the transmit process 152, the CPU 141 operates as the transmitting unit 62 of FIG. 8. In this way, the computer 140 having executed the scale-in program 150 operates as the monitoring server 18. Note that the CPU 141 performing each process in the scale-in program 150 is a hardware component.

The functionality implemented by the scale-in program 150 may be implemented by a semiconductor integrated circuit, such as ASIC.

Figure 13:
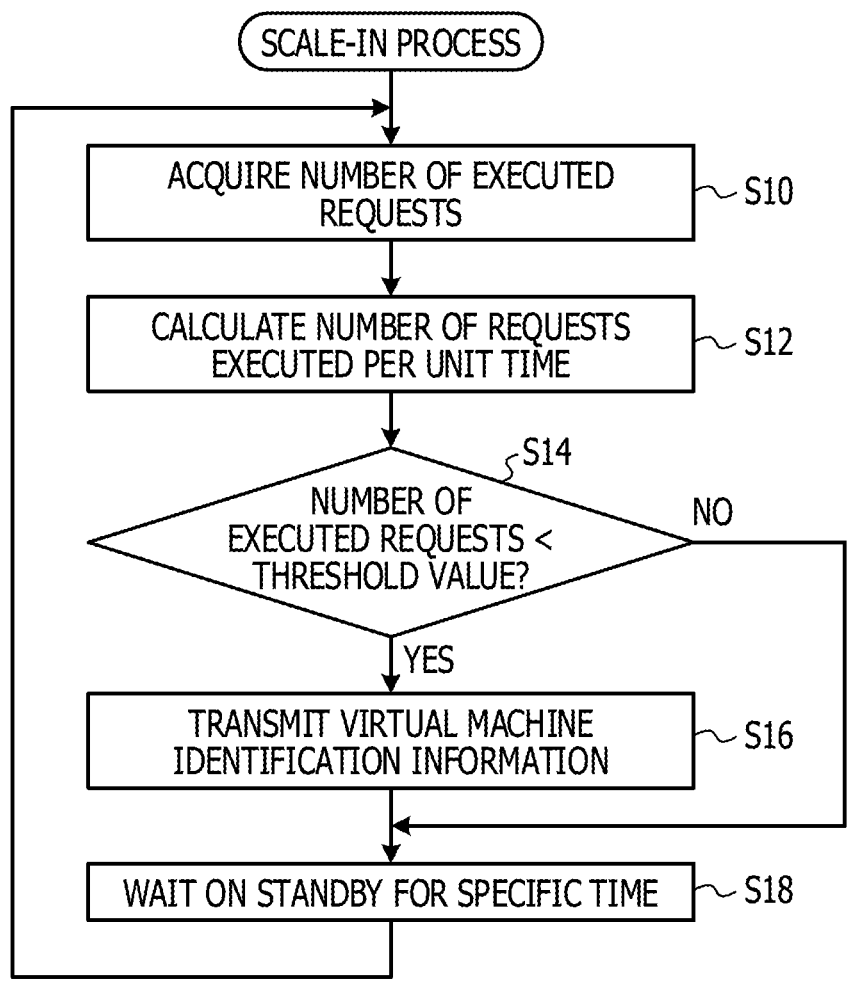
FIG. 13 is a flowchart illustrating an example of a scale-in process of the embodiment.

The process of the information processing system 10 of the embodiment is described below. The scale-in process of FIG. 13 is performed when the monitoring server 18 executes the scale-in program 150. The scale-in process of FIG. 13 is performed by the CPU 141, for example, when the monitoring server 18 is powered on.

In step S10 of the scale-in process of FIG. 13, the acquisition unit 60 acquires from each virtual machine 14 the number of requests that the virtual machine 14 has performed. In step S12, the acquisition unit 60 calculates the number of requests executed per unit time by dividing the number of requests acquired in step S10 by a time interval from when the preceding number of requests is acquired to when the current number of requests is acquired.

In step S14, the transmitting unit 62 determines whether there is a virtual machine 14 having the number of requests executed per unit time calculated in step S12 less than the threshold value. If the determination in step S14 branches to no branch, processing proceeds to step S18. If the determination in step S14 branches to yes branch, processing proceeds to step S16.

In step S16, the transmitting unit 62 sets the virtual machine 14 having the number of requests executed per unit time less than the threshold value to be a halt target virtual machine 14. The transmitting unit 62 transmits the virtual machine identification information identifying the halt target virtual machine 14 to the load balancer 12, the virtual machine 14, and the backup server 16. In step S18, the acquisition unit 60 waits on standby for a specific period of time (1 minute, for example). When the operation in step S18 is complete, processing returns to step S10.

Figure 14:
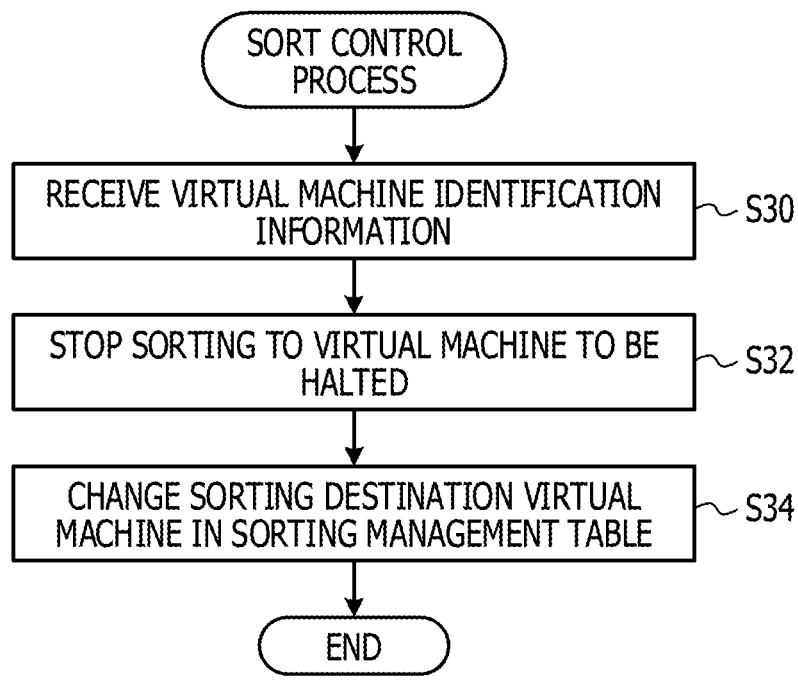
FIG. 14 is a flowchart illustrating an example of a sort control process of the embodiment.

When the load balancer 12 performs the sort control program 90, a sort control process of FIG. 14 is performed. The CPU 81 performs the sort control process of FIG. 14 when the load balancer 12 receives the virtual machine identification information transmitted by the monitoring server 18 in step S16 in the scale-in process.

In step S30 of the sort control process of FIG. 14, the receiving unit 30 receives the virtual machine identification information from the monitoring server 18. In step S32, the sorting unit 32 stops sorting the request to the halt target virtual machine 14 identified by the virtual machine identification information received in step S30.

In step S34, the changing unit 34 may change the sorting destination virtual machine column having a record storing information indicating the halt target virtual machine 14 in the sorting management table 36 to have a virtual machine 14 other than the halt target virtual machine 14. When the operation in step S34 is complete, the sort control process ends.

Figure 15:
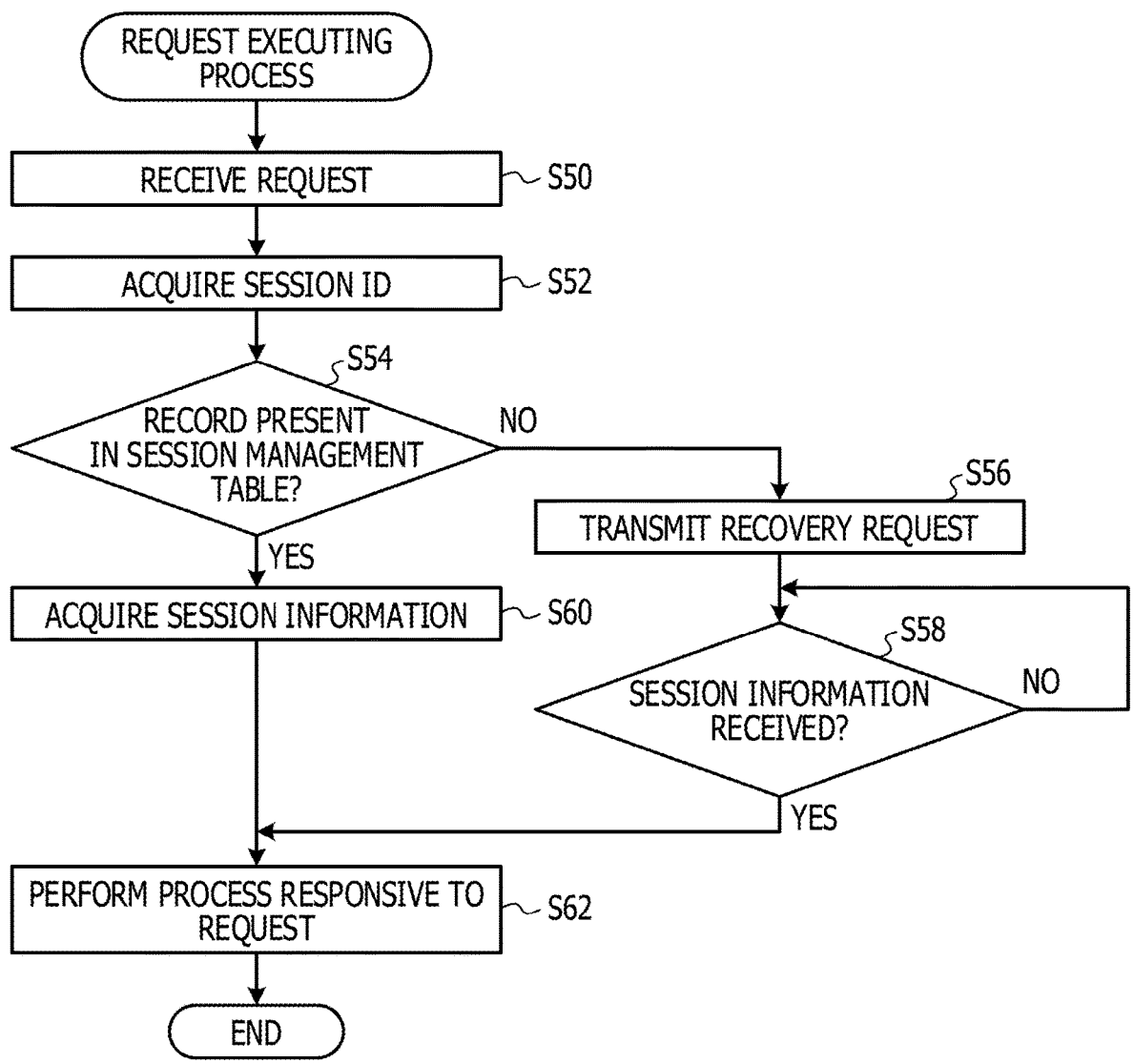
FIG. 15 is a flowchart illustrating an example of a request executing process of the embodiment.
Figure 16:
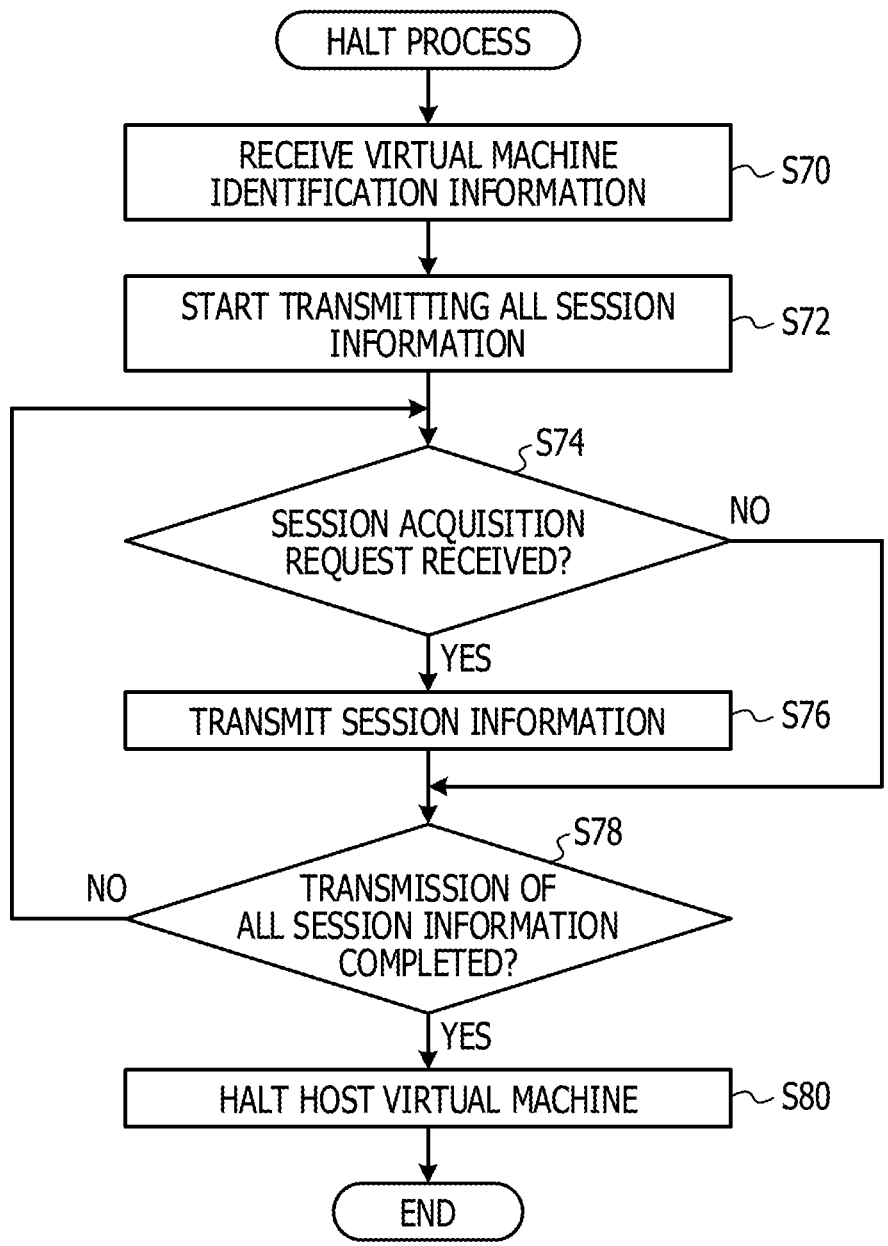
FIG. 16 is a flowchart illustrating an example of a halt process of the embodiment.

When the virtual machine 14 executes the virtual machine control program 110, a request executing process of FIG. 15 and a halt process of FIG. 16 are performed. The request executing process of FIG. 15 is performed by the CPU 101 when the virtual machine 14 receives a request sorted by the load balancer 12, for example. The halt process of FIG. 16 is performed by the CPU 101 when the virtual machine 14 receives the virtual machine identification information transmitted from the monitoring server 18 in step S16 of the scale-in process.

In step S50 of the request executing process of FIG. 15, the receiving unit 40 receives a request sorted by the load balancer 12. In step S52, the executing unit 42 acquires the session ID contained in the request received in step S50. In step S54, the executing unit 42 determines whether a record responsive to the session ID acquired in step S52 is stored in the session management table 48. If the determination in step S54 branches to yes branch, processing proceeds to step S60. If the determination in step S54 branches to no branch, processing proceeds to step S56.

In step S56, the transmitting unit 44 transmits to the backup server 16 a recovery request for the session information responsive to the session ID acquired in step S52. In step S58, the receiving unit 40 waits on standby until the session information responsive to the recovery request transmitted in step S56 is received. When the receiving unit 40 receives the session information transmitted from the backup server 16, the determination in step S58 branches to yes branch, and processing proceeds to step S62.

In step S60, the executing unit 42 references the session management table 48 and acquires the session information responsive to the session ID acquired in step S52. In step S62, the executing unit 42 performs the process responsive to the request using the session information. Via the load balancer 12, the executing unit 42 returns the execution results of the process responsive to the request to the client terminal 24 serving a transmission source of the request. When the operation in step S62 is complete, the request executing process ends.

In step S70 of the halt process of FIG. 16, the receiving unit 40 receives the virtual machine identification information identifying the halt target virtual machine 14 transmitted from the monitoring server 18. In step S72, the transmitting unit 44 starts a process of transmitting successively all records in the session management table 48 to the backup server 16 one record by one record.

In step S74, the receiving unit 40 determines whether a session acquisition request transmitted from the backup server 16 has been received. If the determination in step S74 branches to no branch, processing proceeds to step S78. If the determination in step S74 branches to yes branch, processing proceeds to step S76. In step S76, the transmitting unit 44 references the session management table 48, acquires the session information responsive to the session ID contained the session acquisition request received in step S74, and transmits the acquired session information to the backup server 16.

In step S78, the transmitting unit 44 determines whether the process to transmit all records in the session management table 48 having started in step S72 has been completed.

If the determination in step S78 branches to no branch, processing returns to step S74. If the determination in step S78 branches to yes branch, processing proceeds to step S80. In step S80, the halting unit 46 halts the host apparatus. When the operation in step S80 is complete, the halt process ends.

Figure 17:
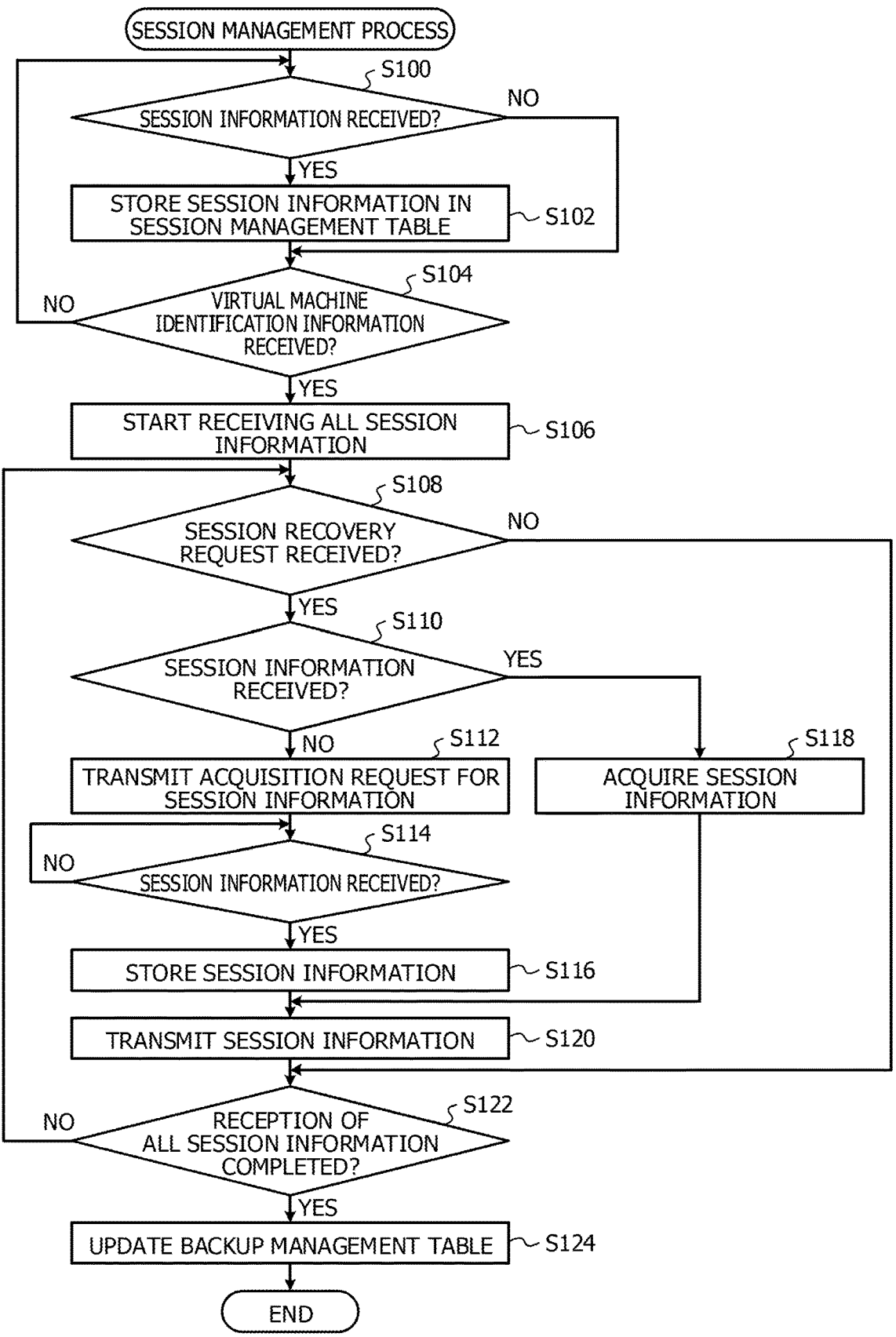
FIG. 17 is a flowchart illustrating an example of a session management process of the embodiment.

When the backup server 16 executes the session management program 130, a session management process of FIG. 17 is carried out. The CPU 121 performs the session management process of FIG. 17 when the backup server 16 is powered on.

In step S100 of the session management process of FIG. 17, the receiving unit 50 determines whether all records in the session management table 48 periodically transmitted from the virtual machine 14 have been received. If the determination in step S100 branches to no branch, processing proceeds to step S104. If the determination in step S100 branches to yes branch, processing proceeds to step S102.

In step S102, the receiving unit 50 stores in the backup management table 56 the session ID and the session information of each of all the records received in step S100. The receiving unit 50 stores, on the virtual machine column of each record stored on the backup management table 56, information identifying the virtual machine 14 serving as a transmission source of all records received in step S100.

In step S104, the receiving unit 50 determines whether the virtual machine identification information transmitted from the monitoring server 18 in step S16 of the scale-in process has been received. If the determination in step S104 branches to no branch, processing returns to step S100. If the determination in step S104 branches to yes branch, processing proceeds to step S106.

In step S106, the receiving unit 50 starts a process to receive all records in the session management table 48 which the backup server 16 starts transmitting in step S72 of the halt process. If, in parallel with the process to be discussed below, the receiving unit 50 receives the records successively transmitted from the backup server 16 one record by one record, the receiving unit 50 stores in the backup management table 56 the session ID and the session information of each received record each time the record is received. When the storage of the session ID and the session information of the received record in the backup management table 56 is complete, the receiving unit 50 updates the backup status column of the record to "completed".

In step S116, the receiving unit 50 is free from storing in the backup management table 56 the session ID and the session information of the received record if that record has a "completed" status in the backup status column.

In step S108, the receiving unit 50 determines whether the recovery request for the session information transmitted from the virtual machine 14 has been received. If the determination in step S108 branches to no branch, processing proceeds to step S122. If the determination in step S108 branches to yes branch, processing proceeds to step S110. In step S110, the transmitting unit 54 references the backup management table 56, and determines whether the backup status column responsive to the session ID contained in the recovery request received in step S108 is "completed". More specifically, the transmitting unit 54 determines whether the session information responsive to the session ID contained the recovery request received in step S108 has been received. If the determination in step S110 branches to yes branch, processing proceeds to step S118. If the determination in step S110 branches to no branch, processing proceeds to step S112.

In step S112, the notifying unit 52 references the backup management table 56 and transmits the acquisition request for the session ID to the virtual machine 14 in the virtual machine column responsive to the session ID contained in the recovery request received in step S108. More specifically, the notifying unit 52 transmits the acquisition request for the session information to the halt target virtual machine 14. In step S114, the receiving unit 50 waits on standby until the session information has been received.

When the halt target virtual machine 14 receives the acquisition request transmitted in step S112, the determination in step S74 of the halt process branches to yes branch, and the session information is transmitted to the backup server 16 in step S76. When the receiving unit 50 receives the session information transmitted from the halt target virtual machine 14, the determination in step S114 branches to yes branch, and processing proceeds to step S116.

In step S116, the receiving unit 50 associates the session information received in step S114 with the session ID contained in the recovery request received in step S108 and stores the session information associated with the session ID in the backup management table 56. Further, the receiving unit 50 updates the backup status column corresponding to the session ID contained in the recovery request received in step S108 to a "completed" status.

In step S118, the transmitting unit 54 references the backup management table 56, and acquires the session information responsive to the session ID contained the recovery request received in step S108. In step S120, the transmitting unit 54 transmits the session information to the virtual machine 14 that is the transmission source of the recovery request received in step S108. In step S122, the receiving unit 50 determines whether the reception process starting in step S106 to receive all the session information has been completed. If the determination in step S122 branches to no branch, processing returns to step S108. If the determination in step S122 branches to yes branch, processing proceeds to step S124.

In step S124, the receiving unit 50 updates the backup management table 56. More specifically, the receiving unit 50 initializes the backup status column by storing null values at the backup status column of all records in the backup management table 56. The receiving unit 50 performs the following process on a record of the virtual machine column in the backup management table 56 where information indicating the halt target virtual machine 14 identified by the virtual machine identification information received in step S104 is stored. More specifically, concerning that record, the receiving unit 50 acquires, from the load balancer 12, information identifying a virtual machine 14 as a new sorting destination corresponding to the session ID, and stores the acquired information at the virtual machine column. When the operation in step S124 has been completed, the session management process ends.

A series of processes until the halt target virtual machine 14 halts is described below with reference to FIG. 18. Another virtual machine 14, other than the halt target virtual machine 14, is selected by the load balancer 12 as a new sorting destination of the request. The following discussion is based on the premise that the halt target virtual machine 14 has performed a process responsive to a request having a session ID "session A" and session information of the session ID "session A" has been stored in the session management table 48 of the halt target virtual machine 14. The session information of the session ID "session A" has also been stored in the backup management table 56 of the backup server 16.

In step S200 of FIG. 18 corresponding to step S16 of the scale-in process, the monitoring server 18 transmits the virtual machine identification information identifying the halt target virtual machine 14 to the load balancer 12, the virtual machine 14, and the backup server 16. Upon receiving the virtual machine identification information in step S202, the load balancer 12 changes the sorting destination of the request to the other virtual machine 14 in the sort control process.

In response to the reception of the virtual machine identification information in step S204, the halt target virtual machine 14 starts successively transmitting all records in the session management table 48 one record by one record to the backup server 16 in the operation in step S72 of the halt process. In response to the reception of the virtual machine identification information in step S206, the backup server 16 starts receiving all records in the session management table 48 in the operation in step S106 of the session management process.

In step S208, the client terminal 24 transmits the request containing the session ID of "session A" to the load balancer 12. In step S210, the load balancer 12 sorts the request transmitted from the client terminal 24 to the other virtual machine 14. Since the request containing the session ID of "session A" was executed by the halt target virtual machine 14 as described above, the session information of the session ID of "session A" was not stored in the session management table 48 on the other virtual machine 14 at that time point.

In step S212 corresponding to step S56 of the request executing process, another machine 14 transmits to the backup server 16 the recovery request for the session information that is used when the process sorted by the load balancer 12 is performed. In step S212, specifically, the other virtual machine 14 transmits to the backup server 16 the recovery request for the session information of the session ID "session A".

The reception process of the session information of the session ID "session A" may be uncompleted at the time point when the operation in step S212 is performed in the reception process started in step S206. In such a case, the following process may be performed.

In step S214 corresponding to step S112 of the session management process, the backup server 16 transmits to the halt target virtual machine 14 the acquisition request for the session information of the session ID contained the recovery request transmitted in step S212. In step S216 corresponding to step S76 of the halt process, the halt target virtual machine 14 transmits to the backup server 16 the session information responsive to the session ID contained in the acquisition request transmitted in step S214.

In step S218 corresponding to step S120 of the session management process, the backup server 16 transmits to the other virtual machine 14 the session information transmitted in step S216. In step S62 of the request executing process, the other virtual machine 14 performs the process responsive to the request using the session information transmitted in step S218. In step S220, the other virtual machine 14 returns the process results to the client terminal 24 via the load balancer 12.

When the process having started in step S204 to transmit all records has been completed, the halt target virtual machine 14 halts the operation thereof in step S222 corresponding to step S80 of the halt process.

In accordance with the embodiment as described above, the virtual machine identification information identifying a virtual machine 14 as a halt target from among multiple virtual machines 14 performing the process responsive to the received request is received. The recovery request for the session information to be used when the other virtual machine 14 performs the process is received from the other virtual machine 14 from among the multiple virtual machines 14. If the session ID responsive to the received recovery request is the session information held by a virtual machine 14 identified by the received virtual machine identification information, the following process is performed. In this case, the acquisition request for the session information responsive to the received recovery request is notified to the virtual machine 14 identified by the virtual machine identification information. When the session information responsive to the notified acquisition request is acquired, the acquired session information is transmitted to the other virtual machine 14. When some of the multiple virtual machines are to be halted, the process based on the latest session information is thus performed.

In accordance with the embodiment, the following process is performed when the reception of all the session information held by the virtual machine 14 to be halted transmitted from the virtual machine 14 to be halted starts. Specifically, if the recovery request is received from the other virtual machine 14 and the session information responsive to the recovery request is not yet received, the acquisition request for the session information is notified to the virtual machine 14 identified by the virtual machine identification information. If some of the virtual machines are to be halted, the process based on the latest session information is performed.

When the load balancer 12 receives the virtual machine identification information in accordance with the embodiment, the request sorting to the virtual machine 14 identified by the virtual machine identification information is suspended. In this way, a new request is not sorted to the virtual machine 14 to be halted. The virtual machine 14 to be halted may thus be quickly halted.

In the above discussion, the web application server of one process operates on one virtual machine 14. The embodiment is not limited to this method. A web application server of multiple processes may operate on a single virtual machine 14.

In the above discussion, a single virtual machine 14 serves as a halt target. The embodiment is not limited to this arrangement. For example, some of the multiple virtual machines 14 may serve as halt targets.

In the above discussion, the sort control program 90 and the virtual machine control program 110 are respectively pre-stored (installed) on the storage unit 83 and the storage unit 103. The present embodiment is not limited to this arrangement. The sort control program 90 and the virtual machine control program 110 may be supplied in a recorded form on one of recording media including a compact-disk read-only memory (CD-ROM), a digital versatile disk ROM (DVD-ROM), a universal serial bus (USB) memory, and a memory card.

In the above discussion, the session management program 130 and the scale-in program 150 are respectively pre-stored (installed) on the storage unit 123 and the storage unit 143. The present embodiment is not limited to this arrangement. The session management program 130 and the scale-in program 150 may be supplied in a recorded form on one of recording media including a CD-ROM, a DVD-ROM, a USB memory, and a memory card.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system comprising:
   a load balancer configured to:
      distribute requests to respective virtual machines that execute the respective requests, and
      stop, when receiving halted virtual machine information that identifies a first virtual machine to be halted in the virtual machines, distributing a request to the first virtual machine and distribute the request to a second virtual machine which is not identified by the halted virtual machine information and is included in the virtual machines; and
   an information processing apparatus including a memory and a processor coupled to the memory and configured to:
      receive the halted virtual machine information,
      receive, from the second virtual machine which does not hold specified session information to be taken over from another request, which is associated with the specified session information and is to be executed by one of the virtual machines other than the second virtual machine, to the request, specified session identification that identifies the specified session information,
      request, when detecting the one of the virtual machines is the first virtual machine to be halted based on the halted virtual machine information, transmission of the specified session information held in the first virtual machine to the information processing apparatus,
      receive the specified session information from the first virtual machine, and
      transmit the specified session information to the second virtual machine,
   wherein each of the virtual machines includes a session management table in which the session information is associated with the session identification, and the second virtual machine transmits the specified session identification in the request to the information processing apparatus when the specified session identification does not exist in the session management table.

2. The information processing system according to claim 1, wherein the transmission of the specified session information is requested when the specified session information has not been received from the first virtual machine after starting reception of all of session information held in the first virtual machine.

3. The information processing system according to claim 2, wherein the reception of all of the session information is started after receiving the halted virtual machine information.

4. The information processing system according to claim 1, wherein the first virtual machine halts after transmitting the specified session information held in the first virtual machine to the information processing apparatus.

5. A session management method comprising:
   distributing, by a load balancer, requests to respective virtual machines that execute the respective requests; and
   stopping, by the load balancer, when receiving halted virtual machine information that identifies a first virtual machine to be halted in the virtual machines, distributing a request to the first virtual machine and distribute the request to a second virtual machine which is not identified by the halted virtual machine information and is included in the virtual machines;
   receiving, by an information processing apparatus, the halted virtual machine information;
   receiving, by the information processing apparatus, from the second virtual machine which does not hold specified session information to be taken over from another request, which is associated with the specified session information and is to be executed by one of the virtual machines other than the second virtual machine, to the request, specified session identification that identifies the specified session information;
   requesting, by the information processing apparatus, when detecting the one of the virtual machines is the first virtual machine to be halted based on the halted virtual machine information, transmission of the specified session information held in the first virtual machine to the information processing apparatus;
   receiving, by the information processing apparatus, the specified session information from the first virtual machine; and
   transmitting, by the information processing apparatus, the specified session information to the second virtual machine,
   wherein each of the virtual machines includes a session management table in which the session information is associated with the session identification, and the second virtual machine transmits the specified session identification in the request to the information processing apparatus when the specified session identification does not exist in the session management table.

6. The session management method according to claim 5, wherein the first virtual machine halts after transmitting the specified session information held in the first virtual machine to the information processing apparatus.

7. A non-transitory computer-readable storage medium storing a program that causes a computer to execute a process, the process comprising:
   distributing, by a load balancer, requests to respective virtual machines that execute the respective requests; and
   stopping, by the load balancer, when receiving halted virtual machine information that identifies a first virtual machine to be halted in the virtual machines, distributing a request to the first virtual machine and distribute the request to a second virtual machine which is not identified by the halted virtual machine information and is included in the virtual machines;
   receiving, by an information processing apparatus, the halted virtual machine information;
   receiving, by the information processing apparatus, from the second virtual machine which does not hold specified session information to be taken over from another request, which is associated with the specified session information and is to be executed by one of the virtual machines other than the second virtual machine, to the request, specified session identification that identifies the specified session information;
   requesting, by the information processing apparatus, when detecting the one of the virtual machines is the first virtual machine to be halted based on the halted virtual machine information, transmission of the specified session information held in the first virtual machine to the information processing apparatus;

receiving, by the information processing apparatus, the specified session information from the first virtual machine; and transmitting, by the information processing apparatus, the specified session information to the second virtual machine, wherein each of the virtual machines includes a session management table in which the session information is associated with the session identification, and the second virtual machine transmits the specified session identification in the request to the information processing apparatus when the specified session identification does not exist in the session management table.

8. The non-transitory computer-readable storage medium according to claim 7, wherein the first virtual machine halts after transmitting the specified session information held in the first virtual machine to the information processing apparatus.

* * * * *